United States Patent [19]
Louderback, Sr.

[11] 4,052,106
[45] Oct. 4, 1977

[54] LIFT MECHANISM FOR TRUCK SIDEBOARDS

[76] Inventor: George D. Louderback, Sr., 108 Sugar Mill Road, Sterling, Colo. 80751

[21] Appl. No.: 652,775

[22] Filed: Jan. 27, 1976

[51] Int. Cl.² .............................................. B60P 1/26
[52] U.S. Cl. ................................ 298/23 MD; 49/340
[58] Field of Search ............ 298/23 M, 23 MD, 23 R, 298/23 S, 35 M; 105/240, 286; 49/340

[56] References Cited
U.S. PATENT DOCUMENTS

| | | | |
|---|---|---|---|
| 1,983,280 | 12/1934 | Flowers | 298/23 MD |
| 2,220,202 | 11/1940 | Bohne | 298/23 M |
| 2,261,099 | 10/1941 | Fairbanks | 298/23 MD |
| 2,410,046 | 10/1946 | Burns | 298/23 S |
| 3,169,491 | 2/1965 | Darlington | 298/35 M |
| 3,977,718 | 8/1976 | Nordberg | 293/23 MD |

FOREIGN PATENT DOCUMENTS 213,520  3/1958  Australia .......................... 298/23 M Primary Examiner—Richard J. Johnson
Attorney, Agent, or Firm—Diller, Brown, Ramik & Wight

[57] ABSTRACT

This disclosure relates to a lift mechanism depicted to be utilized in conjunction with swingably mounted sideboards of truck boxes. The lift mechanism is so constructed wherein it will permit the swinging of a sideboard from an upright box-closing position to a depending position and return without the utilization of the lift mechanism, while at the same time the lift mechanism is actuable to either selectively position the sideboard in an intermediate position or to move the sideboard from an open position to a box-closing position.

16 Claims, 10 Drawing Figures

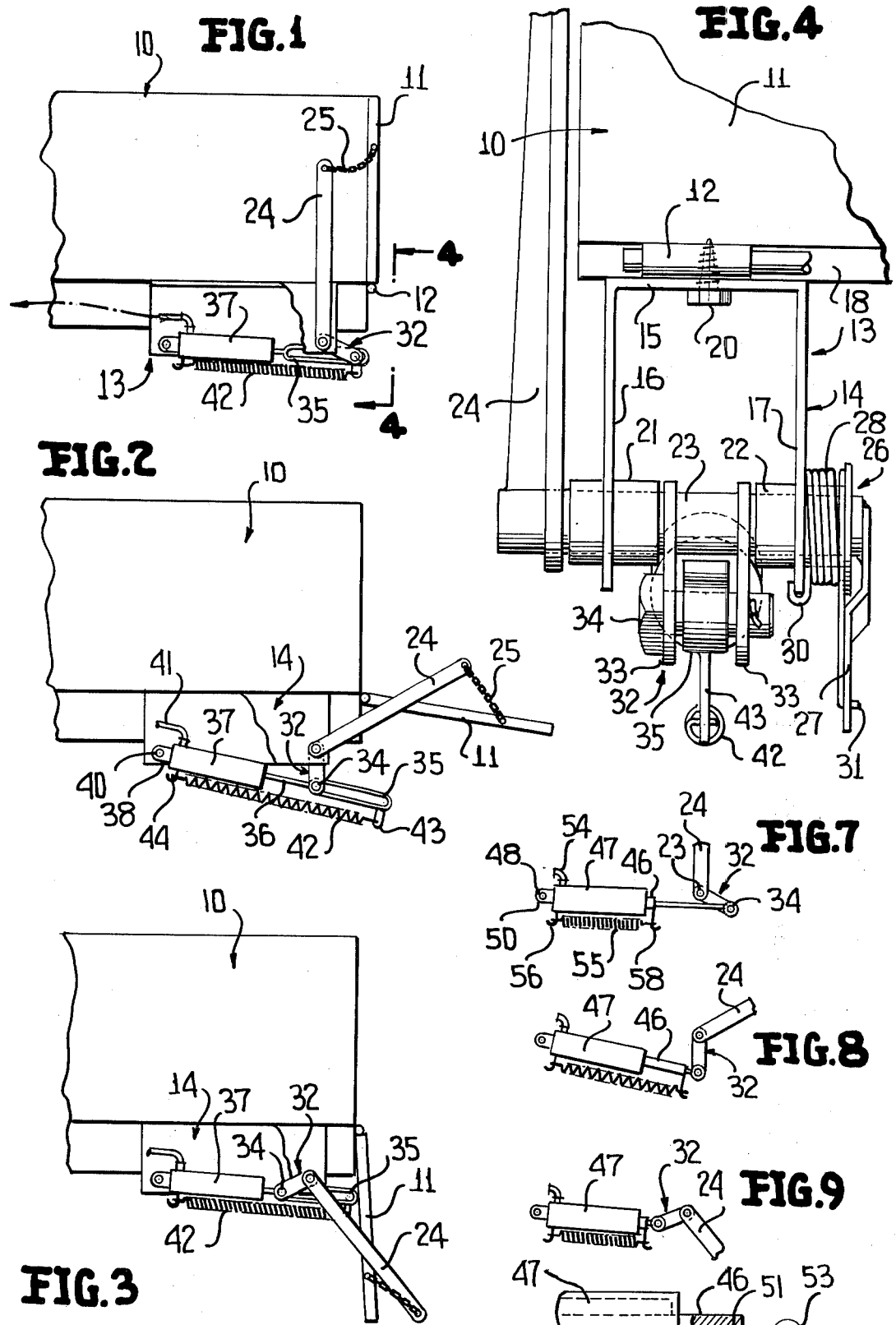

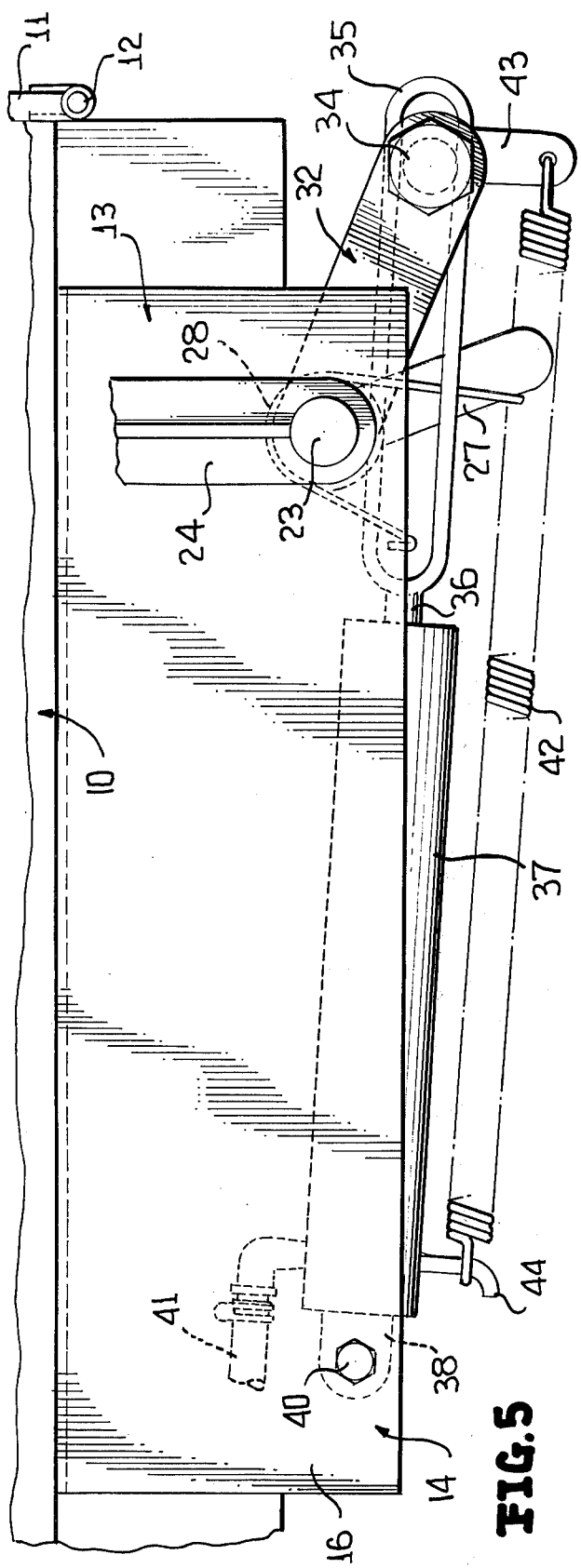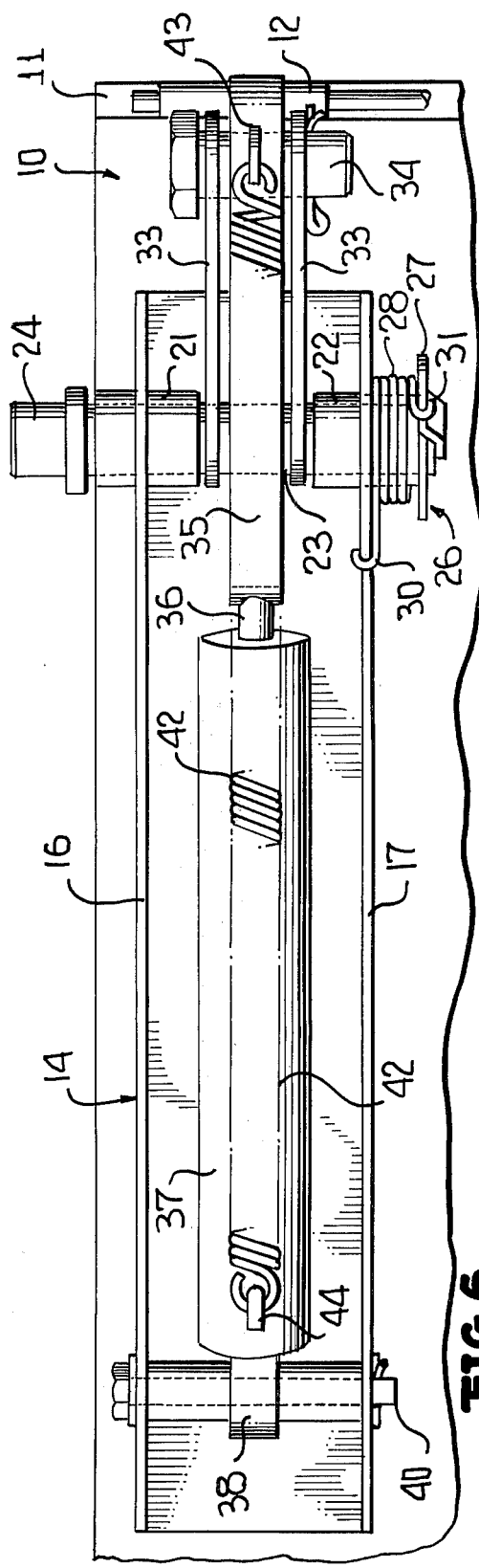

LIFT MECHANISM FOR TRUCK SIDEBOARDS

This invention relates in general to new and useful improvements in lift mechanisms, and more particularly to a novel lift mechanism for use in conjunction with a sideboard on a truck box.

It is well known to provide lift mechanisms for truck tailgates and like moving body components. However, such lift mechanisms always require the actuation of the lift mechanism in order to permit the movement of the truck body components.

In accordance with this invention there is provided a lift mechanism which will permit the manual opening and closing of the body component, such as a sideboard, while at the same time means are provided for controlling the movement of the body component from its normal body-closing position and also to lift the body component from a fully depending position back to the body-closing position.

In accordance with this invention, there is provided a lift device which may be readily attached to existing truck bodies as a unit and which lift mechanism includes a position control arm which is provided with a link attachable to the swingable truck body component for controlling the position thereof. The position control arm has associated therewith an actuating arm which, in turn, has associated therewith positioning means. The positioning means basically includes an extensible fluid motor carrying an elongated guide to which the actuating arm is coupled. The guide is of a length wherein the position control arm can swing fully between a box or body closing position and one wherein the body component is in a depending position without requiring the actuation of the extensible fluid motor. On the other hand, the extensible fluid motor may be utilized so as to shift the position of the guide with respect to the actuating arm and thereby serve to maintain the position control arm in a selected intermediate position or to move the position control arm to an upright position wherein the body component is swung to the body-closing position thereof.

This device is also provided with a counterbalance for generally counterbalancing the weight of the body component.

With the above and other objects in view that will hereinafter appear, the nature of the invention will be more clearly understood by reference to the following detailed description, the appended claims, and the several views illustrated in the accompanying drawings.

IN THE DRAWINGS:

FIG. 1 is a schematic fragmentary elevational view of a truck body having one wall thereof hingably mounted for swinging movement between an upright body-closing position and a depending open position and having associated therewith the lift mechanism of this invention.

FIG. 2 is a view similar to FIG. 1 showing the lift mechanism retaining the body component in a generally horizontal position.

FIG. 3 is a view similar to FIG. 1 showing the body component in a fully opened, depending position without the actuation of the lift mechanism.

FIG. 4 is an enlarged fragmentary elevational view taken generally along the line 4—4 of FIG. 1 and shows generally the specific details of construction of the lift mechanism.

FIG. 5 is an enlarged fragmentary in elevational view showing principally the lift mechanism and the constructional details thereof.

FIG. 6 is a fragmentary bottom plan view showing further the details of the lift mechanism of FIG. 5.

FIGS. 7, 8 and 9 are schematic elevational views corresponding generally to FIGS. 1, 2 and 3 of a modified form of actuating mechanism.

FIG. 10 is an enlarged fragmentary elevational view with parts broken away and shown in section of the portion of the modified form of actuating mechanism.

Referring now to the drawings in detail, it will be seen that there is illustrated in FIG. 1 a conventional truck body or box, generally identified by the numeral 10. The truck body 10 includes a plurality of walls or sides, including a side 11 which, for the purpose of this invention, will be described as a longitudinal side of the truck body 10, but which could be the usual tailgate. Further, while the truck body 10 may be of any construction, the illustrated body may be considered to be a beetbox and the side 11 as being a sideboard. The sideboard 11 is hingably connected to the remainder of the body 10 by means of a longitudinal hinge 12 which permits the sideboard 11 to swing from its normal upstanding, box-closing position approximately 180° to a depending position, as illustrated in FIG. 3. It is to be understood that suitable latch means (not shown) will be provided for retaining the sideboard 11 in its upstanding box-closing position.

In order to facilitate the positioning of the sideboard 11 in an intermediate position, such as that shown in FIG. 2, and also in order to mechanically swing the sideboard 11 from an open position to its upstanding, closed position of FIG. 1, there is provided a lift mechanism, generally identified by the numeral 13. The lift mechanism 13 basically includes a support 14 which may be of any construction but is specifically illustrated as being in the form of an inverted open channel. The support 14, when so constructed, includes an intermediate web 15 and a pair of depending flanges 16,17. The support 14 may be secured to the body 10 in any suitable manner, but it is illustrated as being secured to a bottom of the truck body 10 by a plurality of fasteners 20.

The flanges 16 and 17 are provided with suitable bearing sleeves 21,22 which extend therethrough and in which is mounted for rotation a shaft 23. The shaft 23 extends outwardly of the body 10 and has mounted thereon for rotation therewith a position control arm 24. In its normal position, the position control arm 24 is vertically disposed as is shown in FIG. 1 The position control arm 24 is connected to the sideboard 11 by a flexible link 25 which is illustrated in the form of a chain.

The opposite end of the shape 23 is provided with a counterbalance assembly 26 for counterbalancing the weight of the sideboard 11. The counterbalance assembly 26 includes an arm 27 which is secured to the inner end of the shaft 23 for rotation therewith. The counterbalance assembly 26 also includes a coil spring 28 which is mounted on the bearing element 22 outwardly of the support 14 and has one end 30 thereof engaged with the flange 17 and an opposite end 31 which reacts on the arm 27 to urge the arm 27 and the position control arm 24 in a counterclockwise direction which opposes the clockwise direction of movement of the sideboard 11 towards an open position.

The lift mechanism 13 particularly includes an actuating arm, generally identified by the numeral 32. The actuating arm 32 is in the form of a pair of spaced parallel arms 33 which are rigidly secured to the shaft 23 between the bearing members 21,22 and are rotatable with the shaft 23. The actuating arm 32 also includes a coupling pin 34 which extends between the arm member 33.

Associated with the actuating arm 32 and coupled thereto by means of the pin 34 is an elongated guide in the form of a yoke 35 which is closed at both ends. The yoke 35 extends between the arm members 33 and is carried by a support in the form of a piston rod 36 of an extensible fluid motor 37. The extensible fluid motor 37 is mounted for pivotal movement relative to the support 14 by means of a bracket 38 and a pivot pin 40.

The illustrated fluid motor 37 is of a single acting type and has a single fluid line 41 connected thereto for the purpose of extending the piston rod 36 thereof. The piston rod 36 is constantly urged towards a retracted position by means of a tension spring 42 which extends between a fitting 43 on the yoke 35 at a fitting 44 on the body of the fluid motor 37.

OPERATION

Comparing FIGS. 1 and 3, it will be seen that when the piston rod 36 is in its retracted position, the yoke 35 in no way restricts the swinging of the sideboard 11 from its vertical, box-closing position and its depending position. The yoke 35 is of a length wherein the pin 34 is movable therein the distance required by the swinging of the actuating arm 32 between that position thereof wherein the sideboard 11 is in the box-closing position of FIG. 1 and wherein the sideboard 11 is in its fully opened position of FIG. 3. Thus the sideboard 11 is free to be manually moved between its box-closing position and its depending, fully opened position. It is to be understood that the pivotal mounting of the extensible fluid motor 37 permits the necessary swinging of the yoke 35 to compensate for the vertical movement of the pin 34 as the actuating arm 32 swings first down and then up.

The lift mechanism 13 may be utilized in a twofold manner. First, it may be utilized for the purpose of power-lifting the sideboard 11 from its depending position of FIG. 3 to its box-closing position of FIG. 1. This is accomplished by merely directing fluid into the fluid motor 37 through the fluid line 41 at which time the piston rod 35 will extend and move the yoke 35 to the right. With reference to FIG. 3, it will be seen that since the pin 34 is in the left end of the yoke 35, movement of the yoke 35 to the right will automatically swing the actuating arm 34 to the right in a counterclockwise direction. The movement of the actuating arm 34 in a counterclockwise direction will also result in the swinging of the position control arm 24 in a counterclockwise direction thus lifting the sideboard 11. It is to be appreciated that the stroke of the fluid motor 37 will be sufficient to swing the actuating arm 32 and the position control arm 24 to the positions illustrated in FIG. 1 wherein the sideboard 11 is in its box-closing position and then may be latched in such a position.

Once the sideboard 11 has been returned to its box-closing position, the fluid directed under pressure to the extensible motor 37 through the fluid line 41 may have the pressure thereof relieved, at which time the tension spring 42 will move the piston rod 36 and the yoke 35 back to the left to the position of FIG. 1 so that the sideboard 11 is again free to be manually moved from its box-closing position to its depending, open position of FIG. 3.

It is also to be understood that the fluid motor 37 may be actuated to the extent that the piston rod 36 thereof is only partially extended with the result that the yoke 35 will be retained in an intermediate position as is shown in FIG. 2. The position control arm 24 will then serve to support the sideboard 11 in intermediate position. It is to be noted that the intermediate position of the sideboard 11 may be varied by controlling the extension of the piston rod 36.

It is to be understood that the flow of fluid into and from the extensible fluid motor 37 may be controlled in any conventional manner and the control device is in no way part of this invention. For that reason, no attempt has been made here to disclose the control device.

Referring now to FIGS. 7 through 10, it will be seen that there is illustrated a modified form of actuating mechanism which generally replaces the yoke 35, the piston rod 36 and the fluid motor 37. The change, however, is primarily in the piston rod 36 and the yoke 35.

Referring now to FIGS. 7 through 10, it will be seen that there is provided an extensible fluid motor 47 which replaces the fluid motor 37 and which is provided at the rear end thereof with a bracket 48 which, by means of a pivot pin 50 is pivotally mounted on the support 14 in the same manner as the fluid motor 37.

As is best illustrated in FIG. 10, the fluid motor 47 is provided with a piston rod 46 which is of a tubular construction and has an axial bore 51 therein. Slidably mounted within the axial bore 51 is a rod 52 having at the outer end thereof an eyelet 53 which receives the coupling pin 34 of the actuating arm 32.

The fluid motor 47 is of the single acting type and has at one end thereof a single fluid line 54 which will be connected to a source of fluid under pressure for the purpose of selectively extending the piston rod 46. In order that the piston rod 46 may be automatically retracted, there is provided a tension spring 55 which extends between a bracket 56 on the fluid motor 47 and a similar bracket 58 on the piston rod 46.

It will be understood that the operation of the modified actuating mechanism will be the same as that discussed above. However, in lieu of there being a sliding connection between the actuating arm 32 and the yoke 35, there is a sliding connection between the rod 52 and the piston rod 46.

In FIG. 7, the actuating mechanism is illustrated in the same position as that shown with respect to the actuating mechanism of FIG. 1. In this position, the piston rod 46 is retracted, but the rod 52 is extended. This corresponds to the position of the coupling pin 34 in the far end of the yoke 35.

When it is desired to move the sideboard 11 to the position illustrated in FIG. 2, fluid is directed into the fluid motor 57 so as to extend the piston rod 46. At the same time, due to the weight of the sideboard 11, the rod 52 is telescoped into the piston rod 46 so as to hold the sideboard 11 in the position of FIG. 2.

When it is desired to permit the sideboard 11 to have the depending position of FIG. 3, the piston rod 46 is retracted under the urgence of the spring 56 by removing the fluid pressure from the fluid motor 47 so that the actuating mechanism in FIG. 9 assumes a position corresponding to that of FIG. 3.

It is particularly pointed out here that with the arrangement of FIGS. 7 - 9, no part of the actuating mechanism or positioning means extends beyond the box 10 in any of the positions of the same.

Although only a preferred embodiment of the lift mechanism has been specifically illustrated and described here, it is to be understood that it may be modified without departing from the spirit and scope of the invention as defined by the appended claims.

I claim:

1. A lift mechanism for use in positioning box sideboards and the like, said lift mechanism comprising a support, a position control arm, means mounting said position control arm on said support for pivotal movement about a generally horizontal axis for movement between a generally upright first position and a depending second position, an actuating arm connected to said position control arm for controlling the position of said position control arm, and positioning means carried by said support and coupled to said actuating arm for selectively permitting movement of said position control arm from said first position to said second position independent of movement of said positioning means and for moving said position control arm towards said first position.

2. The lift mechanism of claim 1 together with counterbalance means urging said position control arm towards said first position.

3. A lift mechanism for use in positioning box sideboards and the like, said lift mechanism comprising a support, a position control arm, means mounting said position control arm on said support for pivotal movement about a generally horizontal axis for movement between a generally upright first position and a depending second position, an actuating arm connected to said position control arm for controlling the position of said position control arm, and positioning means carried by said support and coupled to said actuating arm for selectively permitting movement of said position control arm from said first position to said second position and for moving said position control arm towards said first position, said positioning means including an elongated guide of a length generally corresponding to the movement of the coupling between said actuating arm and said positioning means during the movement of said position control arm between said first and second positions, and movable support means coupled to said guide for positioning the same.

4. The lift mechanism of claim 3 wherein a pivot connects said support means to said support for pivotal movement thereby facilitating swinging of said guide to permit movement of said actuating arm.

5. The lift mechanism of claim 3 wherein said guide is in the form of an elongated yoke, and the coupling between said actuating arm and said guide includes a pin carried by said actuating arm and slidably engaged in said yoke.

6. The lift mechanism of claim 3 wherein said elongated guide is in the form of an elongated rod pivotally connected to said actuating arm and slidable relative to said movable support means.

7. The lift mechanism of claim 3 wherein said support means is in the form of an extensible motor.

8. The lift mechanism of claim 7 wherein said extensible motor includes a tubular piston rod, and said elongated guide is in the form of an elongated rod slidable within said piston rod and pivotally connected to said actuating arm.

9. A box assembly comprising a base, a sideboard pivotally connected to said base for swinging movement between an upright box closing first position and a depending out of the way second position, and a lift mechanism carried by said base and coupled to said sideboard for moving and positioning said sideboard, said lift mechanism comprising a support secured to said based, a position control arm, linkage coupling said position control arm to said sideboard, means mounting said position control arm on said support for pivotal movement about a generally horizontal axis for movement between a generally upright first position and a depending second position, an actuating arm connected to said position control arm for controlling the position of said position control arm, and positioning means carried by said support and coupled to said actuating arm for selectively permitting movement of said position control arm from said first position to said second position independent of movement of said positioning means and for moving said position control arm towards said first position.

10. The box assembly of claim 4 together with counterbalance means urging said position control arm in a direction opposite that urged by said sideboard.

11. The box assembly of claim 9 wherein said positioning means includes an elongated guide of a length generally corresponding to the movement of the coupling between said actuating arm and said positioning means during the movement of said sideboard between said sideboard first and second positions, and movable support means coupled to said guide for positioning the same.

12. The box assembly of claim 11 wherein a pivot connects said support means to said support for pivotal movement thereby facilitating swinging of said guide to permit movement of said actuating arm.

13. The box assembly of claim 11 wherein said guide is in the form of an elongated yoke, and the coupling between said actuating arm and said guide includes a pin carried by said actuating arm and slidably engaged in said yoke.

14. The box assembly of claim 11 wherein said elongated guide is in the form of an elongated rod pivotally connected to said actuating arm and slidable relative to said movable support means.

15. The box assembly of claim 11 wherein said support means is in the form of an extensible motor.

16. The box assembly of claim 15 wherein said extensible motor includes a tubular piston rod, and said elongated guide is in the form of an elongated rod slidable within said piston rod and pivotally connected to said actuating arm.

* * * * *